(12) United States Patent
Lukac

(10) Patent No.: US 10,986,284 B2
(45) Date of Patent: Apr. 20, 2021

(54) LIGHT FLICKER MITIGATION IN MACHINE VISION SYSTEMS

(71) Applicant: Intel Corporation, Santa Clara, CA (US)

(72) Inventor: Rastislav Lukac, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 27 days.

(21) Appl. No.: 16/297,861

(22) Filed: Mar. 11, 2019

(65) Prior Publication Data

US 2019/0208106 A1 Jul. 4, 2019

(51) Int. Cl.
| | | |
|---|---|---|
| *H04N 5/235* | (2006.01) | |
| *G06T 5/50* | (2006.01) | |
| *G06T 5/30* | (2006.01) | |
| *G06T 5/00* | (2006.01) | |
| *G06T 5/20* | (2006.01) | |

(52) U.S. Cl.
CPC .......... *H04N 5/2357* (2013.01); *G06T 5/008* (2013.01); *G06T 5/009* (2013.01); *G06T 5/20* (2013.01); *G06T 5/30* (2013.01); *G06T 5/50* (2013.01); *H04N 5/2355* (2013.01); *G06T 2207/10144* (2013.01); *G06T 2207/20208* (2013.01); *G06T 2207/20212* (2013.01); *G06T 2207/20221* (2013.01)

(58) Field of Classification Search
CPC ............. H04N 5/2357; H04N 5/35581; H04N 5/3532; H04N 5/374; H04N 5/2355; G06T 5/008; G06T 5/20; G06T 5/50; G06T 5/30; G06T 5/009; G06T 2207/10144; G06T 2207/20208; G06T 2207/20221; G06T 2207/20212
See application file for complete search history.

(56) References Cited

U.S. PATENT DOCUMENTS

| | | | |
|---|---|---|---|
| 2011/0317028 A1* | 12/2011 | Shinmei ................. | H04N 9/735 348/223.1 |
| 2014/0063294 A1* | 3/2014 | Tatsuzawa ........... | H04N 5/2355 348/239 |
| 2014/0153839 A1* | 6/2014 | Tsuzuki ............... | H04N 5/2357 382/254 |

* cited by examiner

*Primary Examiner* — Lin Ye
*Assistant Examiner* — Tuan H Le
(74) *Attorney, Agent, or Firm* — Schiff Hardin LLP

(57) ABSTRACT

The present disclosure is directed to systems and methods of detecting and minimizing the effect of light flickering in a stitched HDR image formed using a plurality of images obtained using image acquisition sensor circuitry. Light flicker mitigation (LFM) circuitry receives a signal containing data representative of a plurality of images. Multi-feature extraction circuits in the LFM circuitry extract data representative of one or more features from some or all of the pixels included in the plurality of images. Light flicker detection and analysis circuits in the LFM circuitry detect flickering pixels in the plurality of images. Exposure index conversion circuits in the LFM circuitry determine one or more output corrections to apply to the plurality of images as the images are stitched to form a single HDR image in which flickering pixels are minimized, mitigated, or eliminated.

31 Claims, 7 Drawing Sheets

LIGHT FLICKER MITIGATION IN MACHINE VISION SYSTEMS

TECHNICAL FIELD

The present disclosure relates to machine vision systems, more specifically to improving recognition and identification of switched light sources such as light emitting diode sources.

BACKGROUND

Light emitting diodes (LEDs) have found increasing use in motor vehicles, traffic control devices, traffic information devices, emergency vehicle signals, and motorway notifications due to their relatively low cost, long service life expectancy, low power consumption, relatively high efficiency and reliability, and simple electronic control. Thus, LED light flicker mitigation (LFM) has found increasing importance in Advanced Driver Assistance (ADAS) and Camera Monitoring Systems (CMS). In many instances, such ADAS and CMS systems make use of high-dynamic range (HDR) imaging to capture and reproduce a wide range of colors and luminous intensities in various driving situations and lighting conditions to provide more realistic visual content. HDR technology is typically employed whenever scene or visual content exceeds the dynamic range of devices (commonly defined as a ratio between the largest and smallest non-negative quantities an image acquisition device is able to sense and/or reproduce). For example, current HDR image sensors generate an output that includes a number (e.g., three or four) images acquired using different exposure times and/or gain values. A single output image is then generated when the individual exposure images are combined, or stitched, by the image acquisition sensor. In the alternative, multiple images, each having different exposure times and/or gain values, may be combined or stitched using one or more external or host devices, such as one or more image and signal processors (ISPs).

With LED light sources, HDR stitching generally results in incomplete information content due to sensor saturation at longer exposure times or failure to detect and avoid light flickering by an illuminated LED at shorter exposure times. An occurrence of either of these conditions may adversely impact the operation of brake-light detection, night-vision assistance, and/or traffic-signal recognition systems. To avoid such issues LFM systems may be employed.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Figure 1:
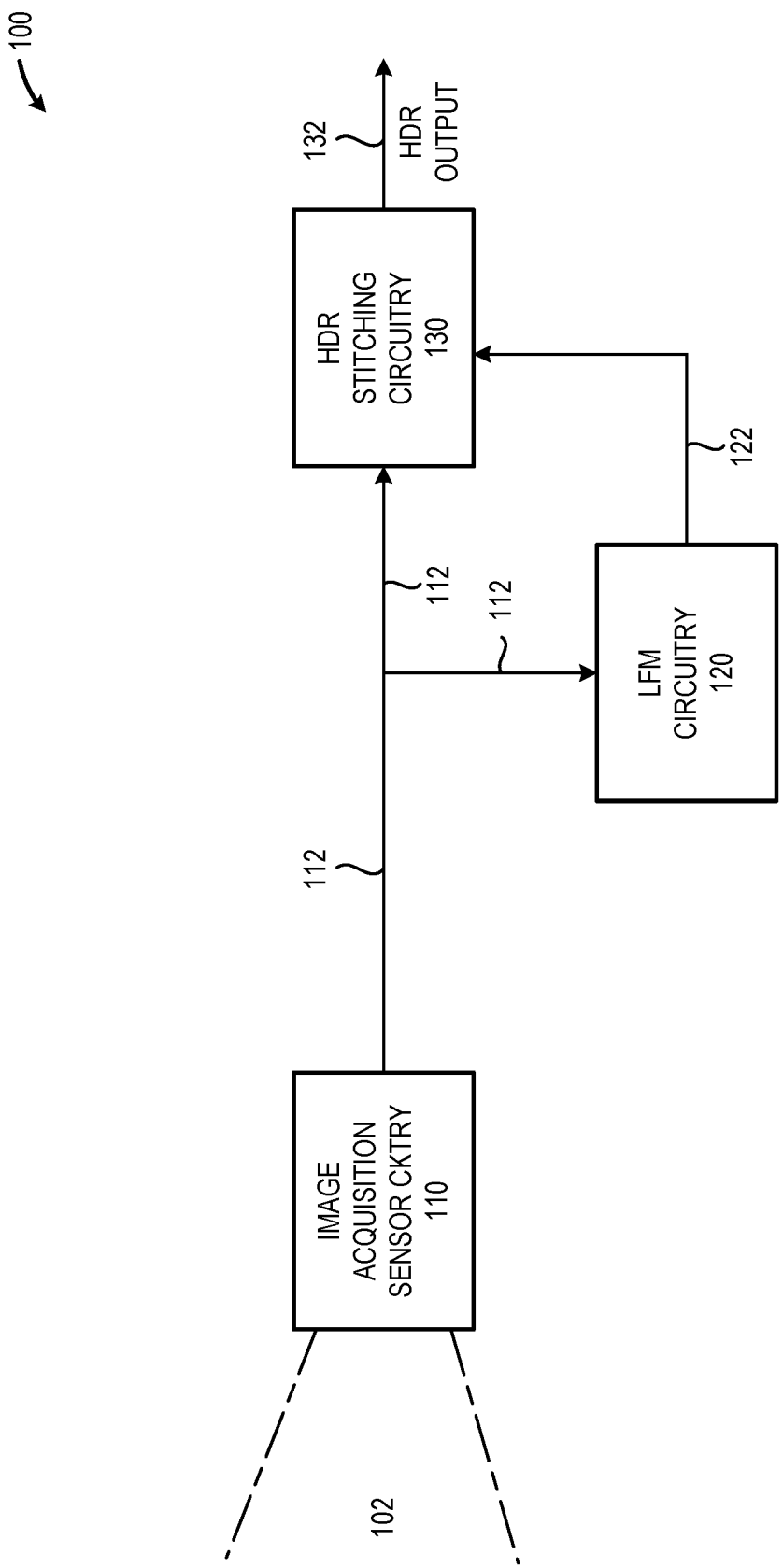
FIG. 1 is a schematic diagram of an illustrative system in which light flicker mitigation (LFM) circuitry receives multi-exposure image data produced by image acquisition sensor circuitry, identifies those pixels and/or pixel blocks demonstrating output variances indicative of flickering, and provides one or more signals containing correction information to HDR stitching circuitry to produce an output image in which the flickering effects are reduced or eliminated, in accordance with at least one embodiment described herein.

Although the following Detailed Description will proceed with reference being made to illustrative embodiments, many alternatives, modifications and variations thereof will be apparent to those skilled in the art.

DETAILED DESCRIPTION

The systems and methods described herein use signal processing methods to restore captured LED information and/or content during the HDR stitching process. More specifically, the systems and methods described herein use light flicker mitigation (LFM) circuitry to receive multi-exposure image data from one or more image acquisition sensors carried by a motor vehicle or used in other camera systems, such as video surveillance cameras, traffic cameras, etc. The LFM circuitry detects the presence of pixels demonstrating a variable output over time that is characteristic of flickering. The LFM circuitry enhances either individual pixels and/or blocks of pixels identified as flickering to minimize the impact of the flickering on the resultant HDR stitched image. The LFM circuitry may also generate one or more exposure control outputs that are communicated to the auto-focus, auto-exposure, auto-white balance (3A) circuitry that control image exposure by the image acquisition sensor circuitry. In embodiments, the LFM circuitry may include various modules, each containing dedicated circuitry capable of providing one or more functions to provide either or both HDR stitching correction and/or image acquisition sensor exposure adjustment to produce images that mitigate the impact of flickering by adjusting the exposure time and/or gain of each image acquired by the image acquisition sensor and by identifying individual pixels or blocks of pixels demonstrating flickering and adjusting the output parameters of the identified pixels during the HDR stitching process. Thus, the systems and methods described herein beneficially and advantageously provide correction information to the 3A circuitry controlling the image acquisition sensor circuitry to mitigate the effects of flicker and provide correction information to the HDR stitching circuitry directed toward those pixels/pixel blocks identified as demonstrating flickering.

An image acquisition system is provided. The system may include: high dynamic range (HDR) sensor circuitry to obtain image data for each of a plurality of pixels included in an image; light flicker mitigation (LFM) circuitry to: receive the image data from the image acquisition sensor; perform multi-exposure feature extraction to identify pixels included in the plurality of pixels that demonstrate flickering; determine, on a per-pixel basis, one or more correction factors to minimize, mitigate, or eliminate flickering of the identified pixels in a final HDR image; HDR stitching circuitry to: selectively combine pixel values using the image data provided by the image acquisition sensor circuitry and the correction factors generated by the LFM circuitry to generate an output HDR image.

An image acquisition method is provided. The method may include: obtaining, via high dynamic range (HDR) sensor circuitry, multi-exposure image data for each of a plurality of pixels included in an image; receiving, by light flicker mitigation (LFM) circuitry, the multi-exposure image data from the image acquisition sensor circuitry; performing, by the LFM circuitry, multi-exposure feature extraction to identify pixels included in the plurality of pixels that demonstrate flickering; determining, by the LFM circuitry on a per-pixel basis, one or more correction factors to minimize, mitigate, reduce, avoid, or eliminate flickering of the identified pixels in a final HDR image; and selectively combine pixel values using the image data provided by the image acquisition sensor circuitry and the correction factors generated by the LFM circuitry to generate an output HDR image.

A non-transitory storage device is provided. The non-transitory storage device includes instructions that, when executed by light flicker mitigation (LFM) circuitry, cause the LFM circuitry to: receive, from high dynamic range (HDR) sensor circuitry, multi-exposure image data for each of a plurality of pixels included in an image; perform multi-exposure feature extraction to identify pixels included in the plurality of pixels that demonstrate flickering; determine, on a per-pixel basis, one or more correction factors to minimize, mitigate, or eliminate flickering of the identified pixels in a final HDR image; and cause HDR stitching circuitry to selectively combine pixel values using the image data provided by the image acquisition sensor circuitry and the correction factors generated by the LFM circuitry to generate an output HDR image.

An image acquisition system is provided. The system may include: means for obtaining, multi-exposure image data for each of a plurality of pixels included in an image; means for receiving the multi-exposure image data from the image acquisition sensor circuitry; means for performing multi-exposure feature extraction to identify pixels included in the plurality of pixels that demonstrate flickering; means for determining, on a per-pixel basis, one or more correction factors to minimize, mitigate, reduce, avoid, or eliminate flickering of the identified pixels in a final HDR image; and means for selectively combine pixel values using the image data provided by the image acquisition sensor circuitry and the correction factors generated by the LFM circuitry to generate an HDR image.

FIG. 1 is a schematic diagram of an illustrative system 100 in which light flicker mitigation (LFM) circuitry 120 receives multi-exposure image data 112 generated, formed, or otherwise produced by image acquisition sensor circuitry 110, identifies those pixels and/or pixel blocks demonstrating output variances indicative of flickering, and provides one or more signals 122 containing correction information to HDR stitching circuitry 130 to produce an output image 132 in which the flickering effects are minimized, mitigated, reduced, avoided, or eliminated, in accordance with at least one embodiment described herein. As depicted in FIG. 1, in embodiments, image acquisition sensor circuitry 110 gathers information and/or data associated with image 102 containing objects within the field of view of the image acquisition sensor circuitry 110. In embodiments, the image acquisition sensor circuitry 110 may be operably coupled to a motor vehicle and acquired images 102 may include objects such as LED light sources such as traffic control devices, motor vehicle indicators, and similar. The image acquisition sensor circuitry 110 generates an output signal 112 that includes information and/or data representative of the scene with LED light sources within the field-of-view of the HDR image sensor 110. The LFM circuitry 120 and the HDR stitching circuitry 130 receive the HDR image sensor output signal 112. The LFM circuitry 120 identifies pixels and/or pixel blocks demonstrating output parameters or other behaviors indicative of flickering and determines one or more correction and/or adjustment parameters to apply in the HDR stitching process. The LFM circuitry 120 generates an output signal 132 that includes information and/or data representative of the one or more correction and/or adjustment parameters to apply during the HDR stitching process and communicates the output signal to the HDR stitching circuitry 130.

The image acquisition sensor circuitry 110 includes any number and/or combination of electronic components, semiconductor devices, and/or logic elements capable of acquiring a plurality of images (multi-exposure image data) of objects disposed or positioned within the field-of-view 102 of the image acquisition sensor circuitry 110. The image acquisition sensor circuitry 110 produces an output signal 112 that includes information and/or data representative of each of the plurality of images acquired by the image acquisition sensor circuitry 110. The image data includes information and/or data associated with each of a plurality of pixels that forms each respective one of the images. Since each of the images is usually acquired using different exposure settings and/or different gain settings, the same pixel or block of pixels may have different characteristics (luminance components, pixel values, etc.) from one image to another image. It is this difference between images that enables the detection and/or identification of flickering pixels and/or pixel blocks by the LFM circuitry 120.

The LFM circuitry 120 includes any number and/or combination of currently available and/or future developed electronic components, semiconductor devices, and/or logic elements capable of receiving multi-exposure image data from the image acquisition sensor circuitry 110, identifying pixels and/or pixel blocks demonstrating behavior indicative of flickering, and determining one or more correction and/or adjustment parameters to apply to the identified flickering pixels during the HDR stitching process to minimize, mitigate, reduce, avoid, or eliminate the flickering effect in the final HDR image.

The HDR stitching circuitry 130 includes any number and/or combination of currently available and/or future developed electronic components, semiconductor devices, and/or logic elements capable of receiving the output signal 112 containing information and/or data representative of multiple images from the image acquisition sensor circuitry 110 and an output signal 122 that includes correction and/or adjustment parameter information and/or data associated with pixels and/or pixel groups included in the images that contain information indicative of flickering pixels and/or pixel groups, and combining the images to produce an output signal in which the pixels and/or pixel blocks identified by the LFM circuitry 120 as demonstrating flickering have been adjusted to reduce, minimize, mitigate, avoid, or eliminate the flickering effect in the output HDR image.

Figure 2:
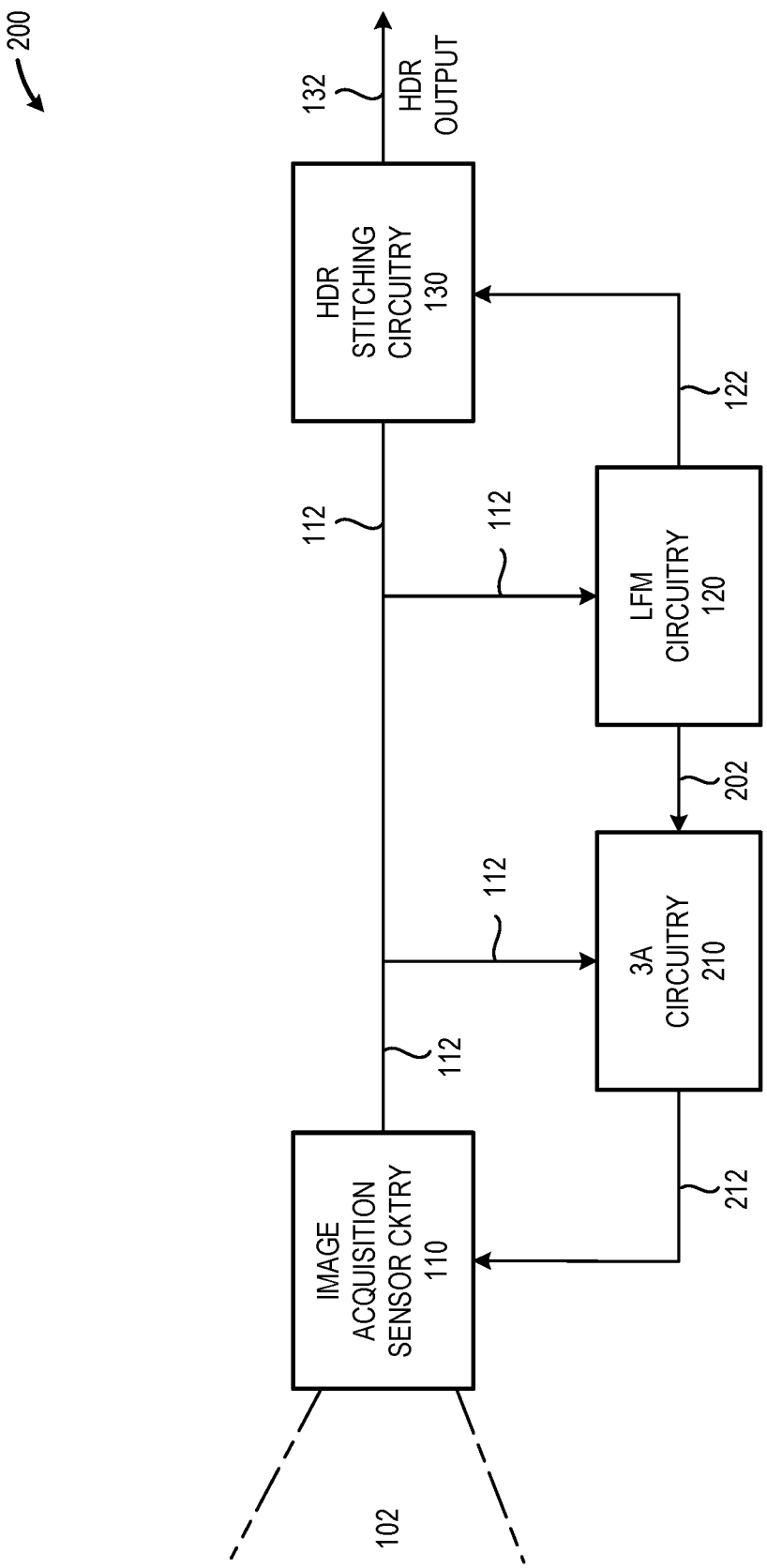
FIG. 2 depicts a block diagram of an illustrative system that includes 3A (Auto-focus, Auto-exposure, Auto-white balance) circuitry that, using the output signal from the image acquisition sensor circuitry and an output signal from the LFM circuitry, generates an output signal containing exposure compensation data that is communicated to the image acquisition sensor circuitry, in accordance with at least one embodiment described herein.

FIG. 2 depicts a block diagram of an illustrative system 200 that includes 3A (Auto-focus, Auto-exposure, Auto-white balance) circuitry 210 that, using the output signal 112 from the image acquisition sensor circuitry 110 and an output signal 202 from the LFM circuitry 120, generates an output signal containing exposure compensation data that is communicated to the image acquisition sensor circuitry 110, in accordance with at least one embodiment described herein. In embodiments, the LFM circuitry 120 may include one or more circuits to determine one or more exposure parameters useful for mitigating, minimizing, or eliminating the flickering effects of one or more pixels and/or pixels groups included in the image data in the output signal 112 provided by the image acquisition sensor circuitry 110. The LFM circuitry 120 generates an output signal 202 that includes information and/or data representative of the corrected exposure parameters that is communicated to the 3A circuitry 210. The 3A circuitry 210 receives the corrected exposure parameters and directly or indirectly causes the image acquisition sensor circuitry 110 to implement the corrected exposure parameters.

Figure 3:
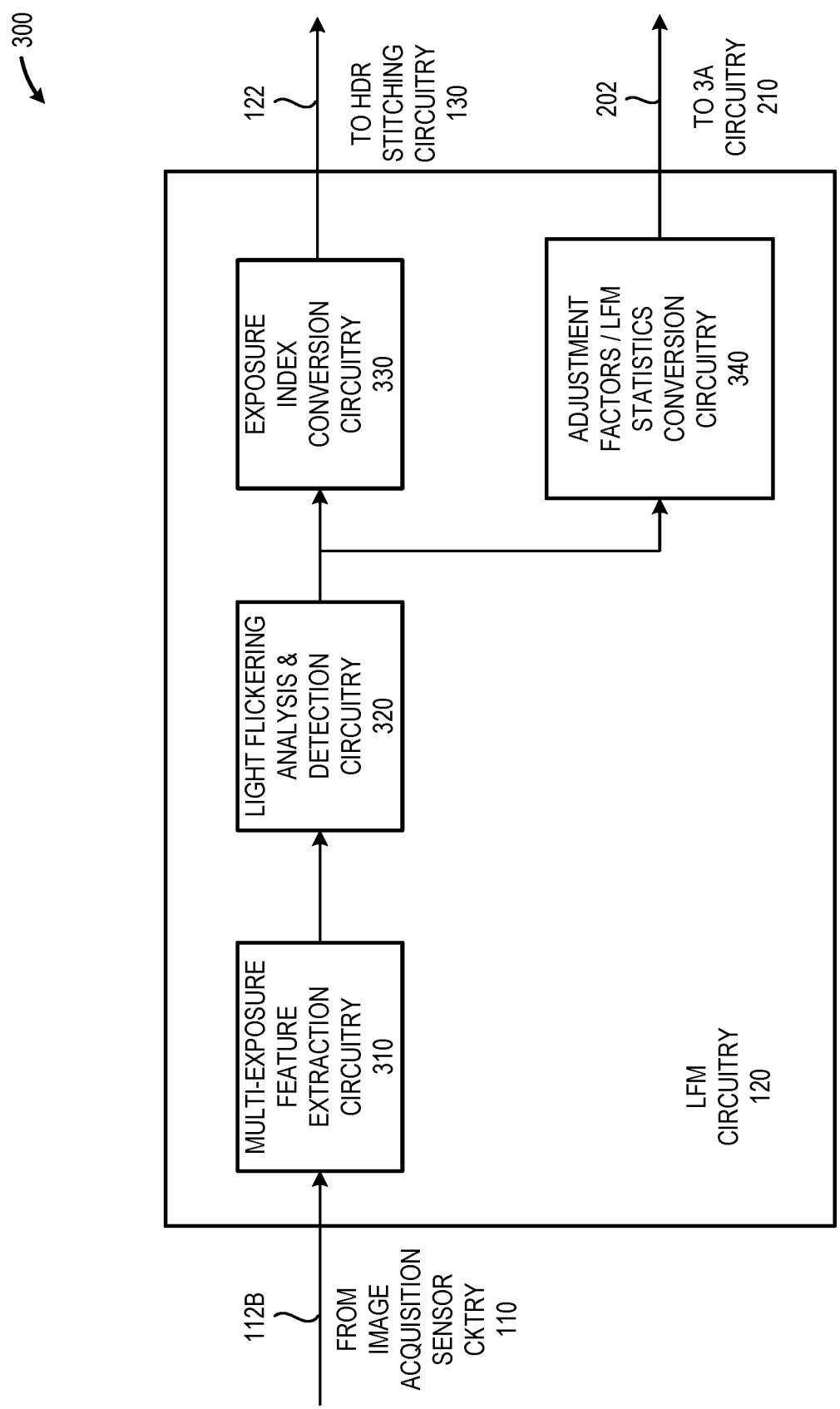
FIG. 3 is a block diagram of a system that includes illustrative LFM circuitry that includes: one or more multi-feature extraction circuits; one or more light flicker detection and analysis circuits; one or more exposure index conversion circuits; and one or more adjustment factor/LFM statistic conversion circuits; in accordance with at least one embodiment described herein.

FIG. 3 is a block diagram of a system 300 that includes illustrative LFM circuitry 120 that includes: one or more multi-feature extraction circuits 310; one or more flicker detection and analysis circuits 320; one or more exposure index conversion circuits 330; and one or more adjustment factor/LFM statistic conversion circuits 340; in accordance with at least one embodiment described herein. As depicted in FIG. 3, the LFM circuitry 120 receives the output signal 112 containing the multi-exposure image data generated by the image acquisition sensor circuitry 110. The one or more multi-feature extraction circuits 310 extract values from the pixels included in some or all of the plurality of images provided by the image acquisition sensor circuitry 110. The values extracted by the one or more multi-feature extraction circuits 310 may use actual pixel values and/or one or more luminance components associated with each of the pixels and/or pixel blocks.

The one or more multi-feature extraction circuits 310 include any number and/or combination of currently available and/or future developed electronic components, semiconductor devices, and/or logic elements capable of extracting, from at least a portion of the image data provided by the image acquisition sensor circuitry 110, information and/or data (e.g., features) useful for performing flicker detection and analysis. In embodiments, the one or more multi-feature extraction circuits 310 may include one or more programmable logic elements capable of executing machine-executable instruction sets that enable the extraction of information and/or data (e.g., features) useful for performing flicker detection and analysis on the multi-exposure image data provided by the image acquisition sensor circuitry 110.

The multi-feature extraction circuit 310 performs multi-exposure feature extraction using actual pixel values or their luminance components of pixels and/or pixel blocks contained in the multi-exposure image data received from the image acquisition sensor circuitry 110. In embodiments, when the image acquisition sensor circuitry 110 provides a plurality of exposure images in Bayer color filter array (CFA) format, the multi-feature extraction circuit 310 may determine a value corresponding to pixel/pixel block luminance via Gaussian filtering with a 3×3 spatial window with coefficients [1 2 1; 2 4 2; 1 2 1]/16. In embodiments, the multi-feature extraction circuit 310 may split each HDR image into overlapping or non-overlapping (e.g., 2×2 Bayer quads) blocks and the luminance component can be approximated as the maximum, mean, or minimum pixel value in each such block. In embodiments, the multi-feature extraction circuit 310 beneficially uses the maximum operator to leverage the favorable signal-to-noise ratios and detectability of image areas affected by sensor saturation. In case of three-channel color images, such as RGB images obtained from Bayer images via demosaicing, the multi-feature extraction circuit 310 may obtain the luminance component in each pixel location as linear combination (weighted average, e.g., (1R+2G+1B)/4 or 0.299R+0.587G+0.114B) of red (R), green (G), and blue (B) components.

The one or more flicker detection and analysis circuits 320 include any number and/or combination of currently available and/or future developed electronic components, semiconductor devices, and/or logic elements capable of comparing pixels values and/or luminance components from the same pixel and/or pixel blocks across multiple images to detect flickering pixels and/or pixel blocks. In embodiments, the one or more flicker detection and analysis circuits 320 may include one or more programmable logic elements capable of executing machine-executable instruction sets that enable the comparison of pixels values, luminance components, and/or other suitable representative values from the same pixel and/or pixel blocks across multiple images to detect flickering pixels and/or pixel blocks. In embodiments, the one or more flicker detection and analysis circuits 320 may perform hard thresholding (e.g., binary output); soft thresholding (e.g., probability-like output); or similar measurement technique (e.g., exponential function in case of pixel values or luminance differences). In embodiments, the one or more flicker detection and analysis circuits 320 may receive defined threshold values or some other control parameters as an input or may adaptively determine such threshold values or other parameters based on the content of the image data received from the HDR image sensors 110.

In embodiments, the one or more flicker detection and analysis circuits 320 may compare a first image with a second image (a long exposure image is compared to a medium exposure image, a medium exposure image is compared to a short exposure image, etc.) in the acquired multi-exposure image data or may compare each image included in a subset of images selected from the plurality of images. In embodiments, the one or more flicker detection and analysis circuits 320 may determine pixel or luminance differences across the multi-exposure image capture using exposure images compensated (normalized) for differences in exposure time. In embodiments, the one or more flicker detection and analysis circuits 320 may determine differences between a first (original) component and a second component adjusted using scale and offset factors. In embodiments, the one or more flicker detection and analysis circuits 320 may determine one or more pixel value ratios or luminance component ratios across some or all of the multi-exposure images. In embodiments, the one or more flicker detection and analysis circuits 320 may evaluate multi-exposure features in pixel locations or image regions affected by sensor saturation.

The one or more exposure index conversion circuits 330 include any number and/or combination of currently available and/or future developed electronic components, semiconductor devices, and/or logic elements capable of converting the output generated by the one or more flicker detection and analysis circuits 320 with the identified flickering pixels and/or pixel blocks to one or more values representative of an exposure index that includes data representative of the contribution of the pixels and/or pixel blocks in some or all of the individual exposure images to the final corrected pixel value in the stitched HDR image 132 produced by the HDR stitching circuitry 130. In embodiments, the one or more exposure index conversion circuits 330 may include one or more programmable logic elements capable of converting the output with the identified flickering pixels and/or pixel blocks to one or more values representative of an exposure index that includes data representative of the contribution of the pixels and/or pixel blocks in some or all of the individual images to the final corrected pixel value in the stitched HDR image 132 produced by the HDR stitching circuitry 130.

In embodiments, the one or more exposure index conversion circuits 330 may convert the output by assigning individual exposure images to some values in the output detection range (e.g., for the pair of long and medium exposures, the minimum value in the detection range can represent the long exposure, whereas the maximum value can represent the medium exposure) and then determining the actual exposure index as a selection (for binary decision) or weighted average of these initial values or indices. In embodiments, the one or more exposure index conversion circuits 330 may repeat this process for different pairs of exposure images and intermediate results combined to obtain the final exposure index, which is then provided to the HDR stitching circuitry 130 (also termed as HDR merge, HDR formation, or DOL processing). In embodiments, this process can be applied per pixel location, block, image region, etc. In embodiments, the obtained exposure indices and/or extracted features may be subject to enhancement via low-pass filtering (e.g., mean, Gaussian, or median filtering) and/or morphological processing (e.g., dilation, erosion, opening, closing) using, respectively, the indices and/or extracted features in their neighborhood to deal with the noise present in the exposure images or possible processing inaccuracies. In embodiments, a plurality of input captured images, a subset of these images, luminance versions of these images, or some other suitable representative versions of these images can also be subject to low-pass filtering, such mean, weighted-average, and detail-preserving (e.g., bilateral and non-local mean) filtering.

The one or more adjustment factor/LFM statistic conversion circuits 340 include any number and/or combination of currently available and/or future developed electronic components, semiconductor devices, and/or logic elements capable of collecting, gathering, or otherwise obtaining image data from at least some of the plurality of images in the signal 112 received from the image acquisition sensor circuitry 110. In embodiments, the one or more exposure index conversion circuits 330 may include one or more programmable logic elements capable of collecting, gathering, or otherwise obtaining image data from at least some of the plurality of images in the signal 112 received from the image acquisition sensor circuitry 110.

In embodiments, the one or more adjustment factor/LFM statistic conversion circuits 340 use at least a portion of the information and/or data extracted from the multi-exposure image capture to generate one or more output signals 202 used to control the auto-exposure (AE) process performed by the 3A circuitry 210. For example, in some embodiments, the one or more adjustment factor/LFM statistic conversion circuits 340 convert information and/or data extracted from one or more of the plurality of images to additive or multiplicative factors to adjust the exposure times determined by the 3A circuitry 210 for each of at least some of the plurality of images. In embodiments, the one or more adjustment factor/LFM statistic conversion circuits 340 calculate one or more representative values for each of at least some of the plurality of images (e.g., the average, weighted average, median, luminance, or maximum value from all detected pixels affected by light flickering), comparing these values to one or more predetermined thresholds (e.g., sensor saturation value or its scaled version, such as 95% of the maximum value the image acquisition sensor circuitry 110 is able to read), and converting the difference or the ratio of these two values to actual exposure adjustment factors, which are then provided as an output signal 202 to the 3A circuitry 210. In embodiments, the LFM circuitry 120 may generate a tensor or array containing image exposure statistics, such as mean values per block of predetermined dimensions. In embodiments, such statistics tensors or arrays may be subject to enhancement via low-pass filtering (e.g., mean, Gaussian, or median filtering) and/or morphological processing (e.g., dilation, erosion, opening, closing) to deal with the noise present in the exposure images or possible processing inaccuracies. The LFM circuitry 120 communicates the tensor or array to the 3A circuitry 210, thereby allowing the 3A circuitry to calculate one or more exposure adjustment factors or to determine more optimal exposure times for some or all of the plurality of images.

Figure 4:
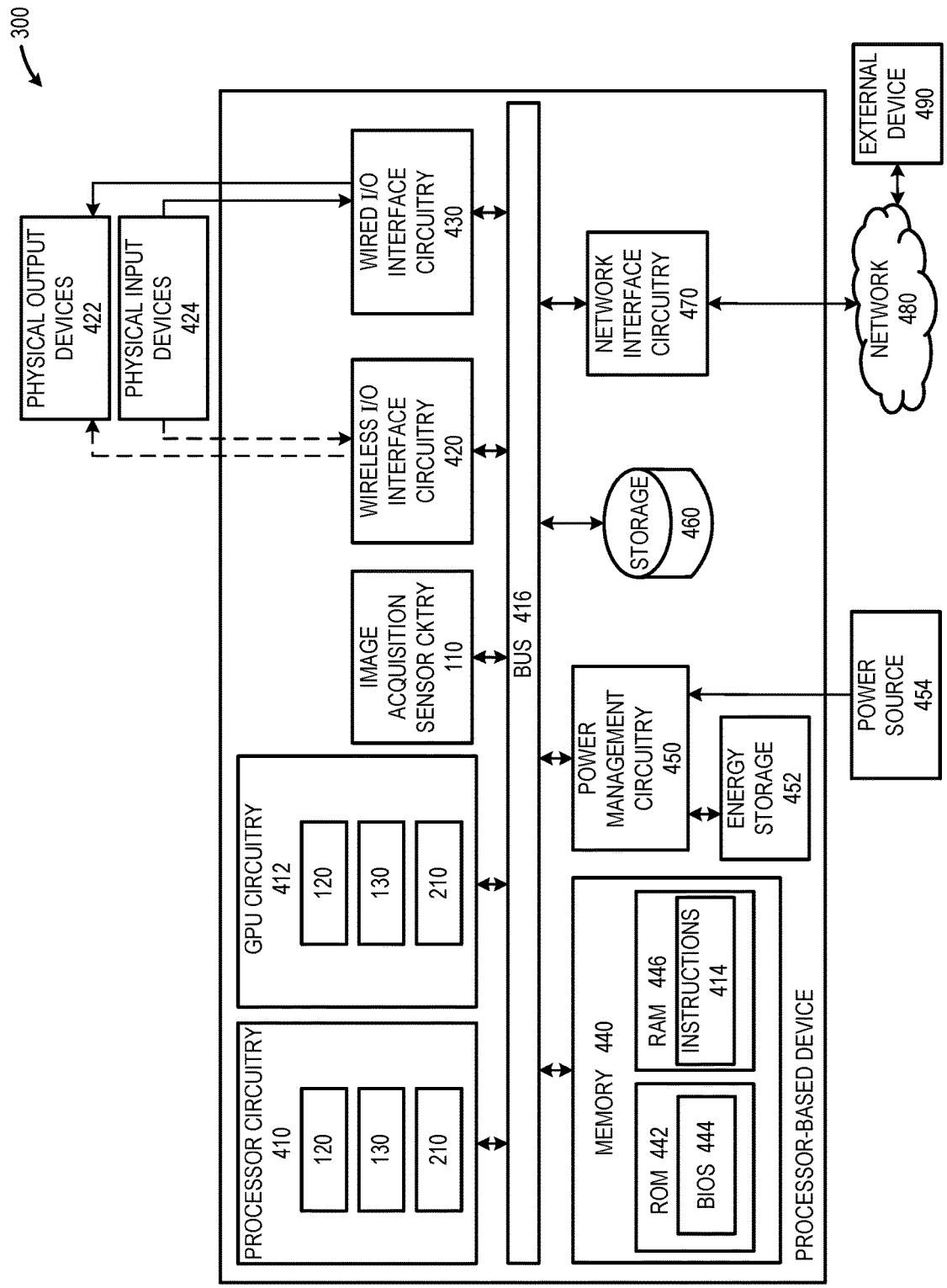
FIG. 4 is a schematic diagram of an illustrative electronic, processor-based, device that includes a central processing unit (CPU) or multi-chip module (MCM) that includes flicker detection and correction circuitry and/or graphical processing unit (GPU) circuitry that includes light flicker detection and correction circuitry, in accordance with at least one embodiment described herein.

FIG. 4 is a schematic diagram of an illustrative electronic, processor-based, device 400 that includes a central processing unit (CPU) or multi-chip module (MCM) 410 that includes flicker detection and correction circuitry 100/200 and/or graphical processing unit (GPU) circuitry 412 that includes flicker detection and correction circuitry 100/200, in accordance with at least one embodiment described herein. The processor-based device 400 includes image acquisition sensor circuitry 110 capable of generating an output signal 112 that includes information and/or data representative of a plurality of images, each obtained using different exposure settings and/or gain, that contain information and/or data associated with object appearing within the field-of-view 102 of the image acquisition sensor circuitry 110. The processor-based device 400 may additionally include one or more of the following: a wireless input/output (I/O) interface 420, a wired I/O interface 430, system memory 440, power management circuitry 450, a non-transitory storage device 460, and a network interface 170 used to communicatively couple the processor-based device 400 to one or more external devices (e.g., a cloud-based server) 490 via one or more networks 480. The following discussion provides a brief, general description of the components forming the illustrative processor-based device 400. Example, non-limiting processor-based devices 400 may include, but are not limited to: autonomous motor vehicles, semi-autonomous motor vehicles, manually controlled motor vehicles, smartphones, wearable computers, portable computing devices, handheld computing devices, desktop computing devices, blade server devices, workstations, and similar.

The processor-based device 400 includes processor circuitry 410 that may provide all or a portion of the LFM circuitry 120, the HDR stitching circuitry 130, and/or the 3A circuitry 210. In embodiments, some or all of the LFM circuitry 120, the HDR stitching circuitry 130, and/or the 3A circuitry 210 may be in the form of an application specific integrated circuit (ASIC) or similar chiplet-based integrated circuit that is disposed along with the processor circuitry 410 as a system-on-chip (SoC) or Multi-Chip Module (MCM) semiconductor package. In embodiments, the processor-based device 400 includes GPU circuitry 412 that may provide all or a portion of the LFM circuitry 120, the HDR stitching circuitry 130, and/or the 3A circuitry 210. In embodiments, some or all of the LFM circuitry 120, the HDR stitching circuitry 130, and/or the 3A circuitry 210 may be in the form of an application specific integrated circuit (ASIC) or similar chiplet-based integrated circuit that is disposed along with the GPU circuitry 412 as a system-on-chip (SoC) or Multi-Chip Module (MCM) semiconductor package.

Those skilled in the relevant art will appreciate that the illustrated embodiments as well as other embodiments may be practiced with other processor-based device configurations, including portable electronic or handheld electronic devices, for instance smartphones, portable computers, wearable computers, consumer electronics, personal computers ("PCs"), network PCs, minicomputers, server blades, mainframe computers, and the like. The processor circuitry 410 may include any number of hardwired or configurable circuits, some or all of which may include programmable and/or configurable combinations of electronic components, semiconductor devices, and/or logic elements that are disposed partially or wholly in a PC, server, or other computing system capable of executing machine-readable instructions.

The processor-based device 400 includes a bus or similar communications link 416 that communicably couples and facilitates the exchange of information and/or data between various system components including the processor circuitry 410, the graphics processor circuitry 412, one or more wireless I/O interfaces 420, one or more wired I/O interfaces 430, the system memory 440, one or more storage devices 460, and/or the network interface circuitry 470. The processor-based device 400 may be referred to in the singular herein, but this is not intended to limit the embodiments to a single processor-based device 400, since in certain embodiments, there may be more than one processor-based device 400 that incorporates, includes, or contains any number of communicably coupled, collocated, or remote networked circuits or devices.

The processor circuitry 410 may include any number, type, or combination of currently available or future developed devices capable of executing machine-readable instruction sets. The processor circuitry 410 may include but is not limited to any current or future developed single- or multi-core processor or microprocessor, such as: on or more systems on a chip (SOCs); central processing units (CPUs); digital signal processors (DSPs); graphics processing units (GPUs); application-specific integrated circuits (ASICs), programmable logic units, field programmable gate arrays (FPGAs), and the like. Unless described otherwise, the construction and operation of the various blocks shown in FIG. 4 are of conventional design. Consequently, such blocks need not be described in further detail herein, as they will be understood by those skilled in the relevant art. The bus 416 that interconnects at least some of the components of the processor-based device 400 may employ any currently available or future developed serial or parallel bus structures or architectures.

The system memory 440 may include read-only memory ("ROM") 442 and random access memory ("RAM") 446. A portion of the ROM 442 may be used to store or otherwise retain a basic input/output system ("BIOS") 444. The BIOS 444 provides basic functionality to the processor-based device 400, for example by causing the processor circuitry 410 to load and/or execute one or more machine-readable instruction sets 414. In embodiments, at least some of the one or more machine-readable instruction sets 414 cause at least a portion of the processor circuitry 410 to provide, create, produce, transition, and/or function as a dedicated, specific, and particular machine, for example a light flicker detection and analysis system that includes some or all of the LFM circuitry 120, the HDR stitching circuitry 130, and/or the 3A circuitry 210.

The processor-based device 400 may include at least one wireless input/output (I/O) interface 420. The at least one wireless I/O interface 420 may be communicably coupled to one or more physical output devices 422 (tactile devices, video displays, audio output devices, hardcopy output devices, etc.). The at least one wireless I/O interface 420 may communicably couple to one or more physical input devices 424 (pointing devices, touchscreens, keyboards, tactile devices, etc.). The at least one wireless I/O interface 420 may include any currently available or future developed wireless I/O interface. Example wireless I/O interfaces include, but are not limited to: BLUETOOTH®, near field communication (NFC), and similar.

The processor-based device 400 may include one or more wired input/output (I/O) interfaces 430. The at least one wired I/O interface 430 may be communicably coupled to one or more physical output devices 422 (tactile devices, video displays, audio output devices, hardcopy output devices, etc.). The at least one wired I/O interface 430 may be communicably coupled to one or more physical input devices 424 (pointing devices, touchscreens, keyboards, tactile devices, etc.). The wired I/O interface 430 may include any currently available or future developed I/O interface. Example wired I/O interfaces include but are not limited to: universal serial bus (USB), IEEE 1394 ("FireWire"), and similar.

The processor-based device 400 may include one or more communicably coupled, non-transitory, data storage devices 460. The data storage devices 460 may include one or more hard disk drives (HDDs) and/or one or more solid-state storage devices (SSDs). The one or more data storage devices 460 may include any current or future developed storage appliances, network storage devices, and/or systems. Non-limiting examples of such data storage devices 460 may include, but are not limited to, any current or future developed non-transitory storage appliances or devices, such as one or more magnetic storage devices, one or more optical storage devices, one or more electro-resistive storage devices, one or more molecular storage devices, one or more quantum storage devices, or various combinations thereof. In some implementations, the one or more data storage devices 460 may include one or more removable storage devices, such as one or more flash drives, flash memories, flash storage units, or similar appliances or devices capable of communicable coupling to and decoupling from the processor-based device 400.

The one or more data storage devices 460 may include interfaces or controllers (not shown) communicatively coupling the respective storage device or system to the bus 416. The one or more data storage devices 460 may store, retain, or otherwise contain machine-readable instruction sets, data structures, program modules, data stores, databases, logical structures, and/or other data useful to the processor circuitry 410 and/or graphics processor circuitry 412 and/or one or more applications executed on or by the processor circuitry 410 and/or graphics processor circuitry 412. In some instances, one or more data storage devices 460 may be communicably coupled to the processor circuitry 410, for example via the bus 416 or via one or more wired communications interfaces 430 (e.g., Universal Serial Bus or USB); one or more wireless communications interfaces 420 (e.g., Bluetooth®, Near Field Communication or NFC); and/or one or more network interfaces 470 (IEEE 802.3 or Ethernet, IEEE 802.11, or WiFi®, etc.).

Machine-readable instruction sets 414 and other programs, applications, logic sets, and/or modules may be stored in whole or in part in the system memory 440. Such instruction sets 414 may be transferred, in whole or in part, from the one or more data storage devices 460. The instruction sets 414 may be loaded, stored, or otherwise retained in system memory 440, in whole or in part, during execution by the processor circuitry 410 and/or graphics processor circuitry 412.

The processor-based device 400 may include power management circuitry 450 that controls one or more operational aspects of the energy storage device 452. In embodiments, the energy storage device 452 may include one or more primary (i.e., non-rechargeable) or secondary (i.e., rechargeable) batteries or similar energy storage devices. In embodiments, the energy storage device 452 may include one or more supercapacitors or ultracapacitors. In embodiments, the power management circuitry 450 may alter, adjust, or control the flow of energy from an external power source 454 to the energy storage device 452 and/or to the processor-based device 400. The power source 454 may include, but is not limited to, a solar power system, a commercial electric grid, a portable generator, an external energy storage device, or any combination thereof.

For convenience, the processor circuitry 410, the graphics processor circuitry 412, the wireless I/O interface 420, the wired I/O interface 430, the system memory 440, the power management circuitry 450, the storage device 460, and the network interface 470 are illustrated as communicatively coupled to each other via the bus 416, thereby providing connectivity between the above-described components. In alternative embodiments, the above-described components may be communicatively coupled in a different manner than illustrated in FIG. 4. For example, one or more of the above-described components may be directly coupled to other components, or may be coupled to each other, via one or more intermediary components (not shown). In another example, one or more of the above-described components may be integrated into the processor circuitry 410 and/or the graphics processor circuitry 412. In some embodiments, all or a portion of the bus 416 may be omitted and the components are coupled directly to each other using suitable wired or wireless connections.

Figure 5:
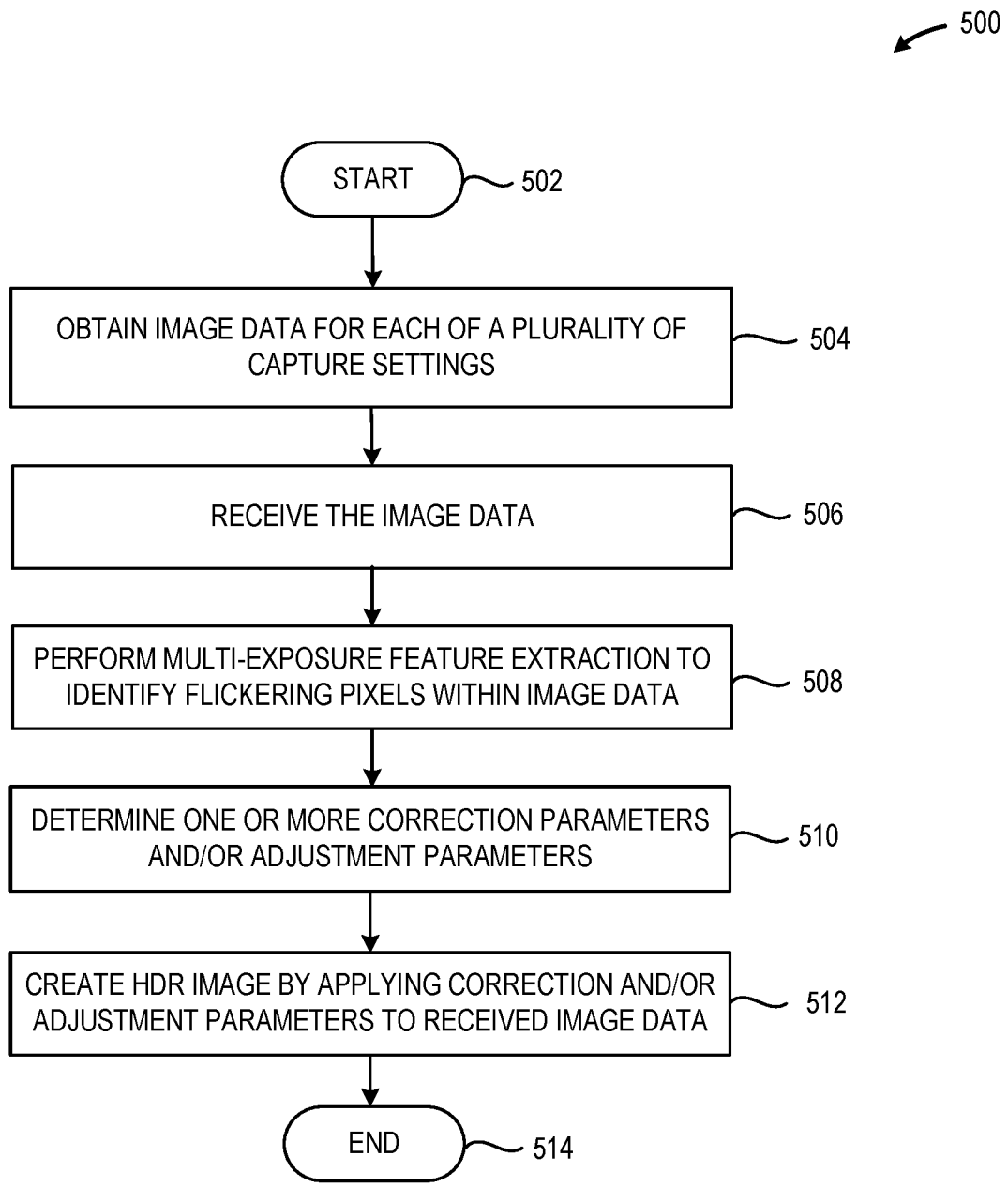
FIG. 5 is a high-level flow diagram of an illustrative method of detecting and analyzing images for the presence of flickering pixels, in accordance with at least one embodiment described herein.

FIG. 5 is a high-level flow diagram of an illustrative method 500 of detecting and analyzing images for the presence of flickering pixels, in accordance with at least one embodiment described herein. In embodiments, the HDR image sensor circuitry 110 obtains a plurality of images, each acquired using its own capture settings, such as the exposure time, analog and digital gains, etc. Various objects, such as switched light sources (e.g., LED light sources), may provide the appearance of flickering in the acquired images. Such flickering may cause safety or operational concerns when motor vehicle informational and/or control systems are unable to properly detect or analyze the content of the acquired images. The method 500 minimizes, mitigates, or even eliminates the occurrence of flickering in the final HDR stitched image produced by the HDR stitching circuitry 130 and commences at 502.

At 504, the image acquisition sensor circuitry 110 generates one or more output signals 112 that include information and/or data representative of each of a plurality of images, each composed of a number of pixels and/or pixel blocks and each obtained using its own capture settings, such as the exposure time, analog and digital gains, etc. Each of the images included in the multi-exposure image capture contains information and/or data representative of one or more objects, such as one or more LED light sources, disposed in the field-of-view 102 of the image acquisition sensor circuitry 110.

At 506, the LFM circuitry 120 receives the signal 112 that includes the information and/or data representative of at least a portion of the plurality of images obtained or otherwise acquired by the image acquisition sensor circuitry 110.

At 508, the LFM circuitry 120 performs multi-exposure feature extraction using the received data representative of the plurality of images. In embodiments, the LFM circuitry 120 extracts, from at least a portion of the image data provided by the image acquisition sensor circuitry 110, information and/or data (e.g., features) useful for performing flicker detection and analysis.

At 510, the LFM circuitry 120 determines, calculates, or otherwise obtains one or more correction parameters and/or adjustment parameters to adjust values associated with pixels and/or pixel groups identified by the LFM circuitry 120 as flickering at 508. The LFM circuitry 120 generates an output signal 122 that includes information and/or data representative of the determined correction parameters and/or adjustment parameters to minimize, mitigate, alter, avoid, or eliminate the effects of flickering pixels and/or pixel blocks in the HDR image generated by the HDR stitching circuitry 130.

At 512, the HDR stitching circuitry 130 receives the output signal 122 from the LFM circuitry 120 and uses the correction factors included in the signal to generate a single HDR output image 132 using the information and/or data representative of some or all of the images included in the image data generated by the image acquisition sensor circuitry 110. The method 500 concludes at 514.

Figure 6:
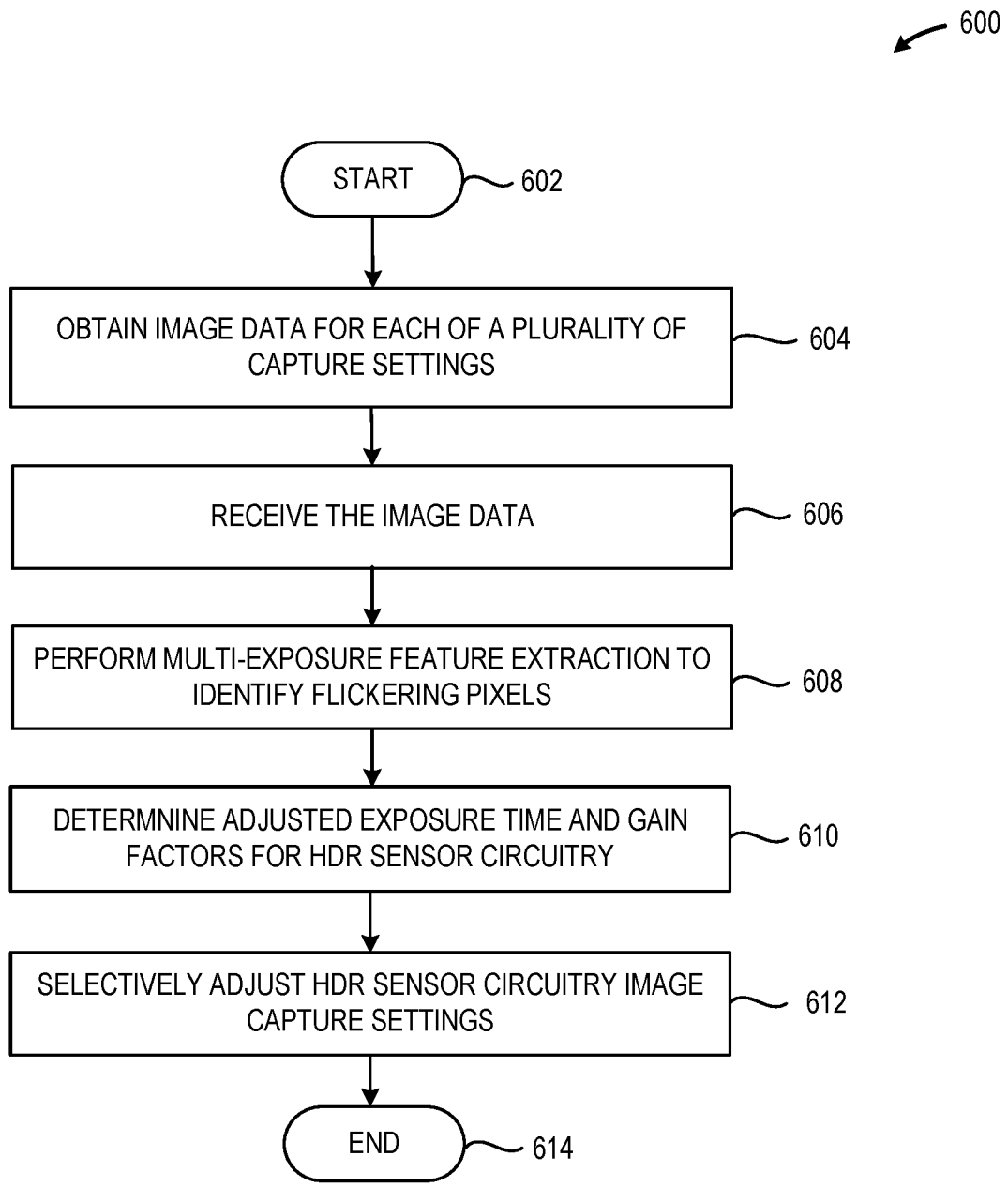
FIG. 6 is a high-level flow diagram of an illustrative method of adjusting or otherwise correcting one or more exposure settings and/or gain of the image acquisition sensor circuitry for each of the images included in the plurality of images acquired by the image acquisition sensor circuitry, in accordance with at least one embodiment described herein.

FIG. 6 is a high-level flow diagram of an illustrative method 600 of adjusting or otherwise correcting one or more capture settings (e.g., exposure time, analog and digital gains) of the image acquisition sensor circuitry 110 for each of the images included in the multi-exposure image data acquired by the image acquisition sensor circuitry 110, in accordance with at least one embodiment described herein. In embodiments, the LFM circuitry 120 analyzes the multi-exposure image data and generates an output signal 202 that includes at least one of: exposure correction data and gain correction data. The LFM circuitry 120 generates an output signal 202 that includes the corrected exposure and/or gain settings or values and communicates the output signal 202 to the 3A circuitry 210. The method 600 commences at 602.

At 604, the image acquisition sensor circuitry 110 generates one or more output signals 112 that include information and/or data representative of each of a plurality of images, each composed of a number of pixels and/or pixel blocks and each obtained its own capture settings, such as the exposure time, analog and digital gains, etc. Each of the images included in the plurality of images contains information and/or data representative of one or more objects, such as one or more LED light sources, disposed in the field-of-view 102 of the image acquisition sensor circuitry 110.

At 606, the LFM circuitry 120 receives the signal 112 that includes the information and/or data representative of at least a portion of the plurality of images obtained or otherwise acquired by the image acquisition sensor circuitry 110.

At 608, the LFM circuitry 120 performs multi-exposure feature extraction using the received data representative of the plurality of images. In embodiments, the LFM circuitry 120 extracts, from at least a portion of the image data provided by the image acquisition sensor circuitry 110, information and/or data (e.g., features) useful for performing flicker detection and analysis.

At 610, the LFM circuitry 120 determines, calculates, acquires, or otherwise obtains one or more image capture correction values, related to the exposure time and gain settings, to adjust the image capture settings of the image acquisition sensor circuitry 110 to minimize, mitigate, adjust, avoid, and/or eliminate the effect of flickering pixels and/or pixel blocks in the plurality of images. The LFM circuitry 120 generates an output signal 202 that includes information and/or data representative of the determined corrected exposure and/or gain values to minimize, mitigate, alter, or eliminate the effects of flickering pixels and/or pixel blocks in the HDR image generated by the HDR stitching circuitry 130.

At 612, the 3A circuitry 210 receives the output signal 202 from the LFM circuitry 120 and uses the correction factors included in the signal to adjust the exposure and/or gain of at least a portion of the plurality of images obtained by the image acquisition sensor circuitry 110. The method 600 concludes at 614.

Figure 7:
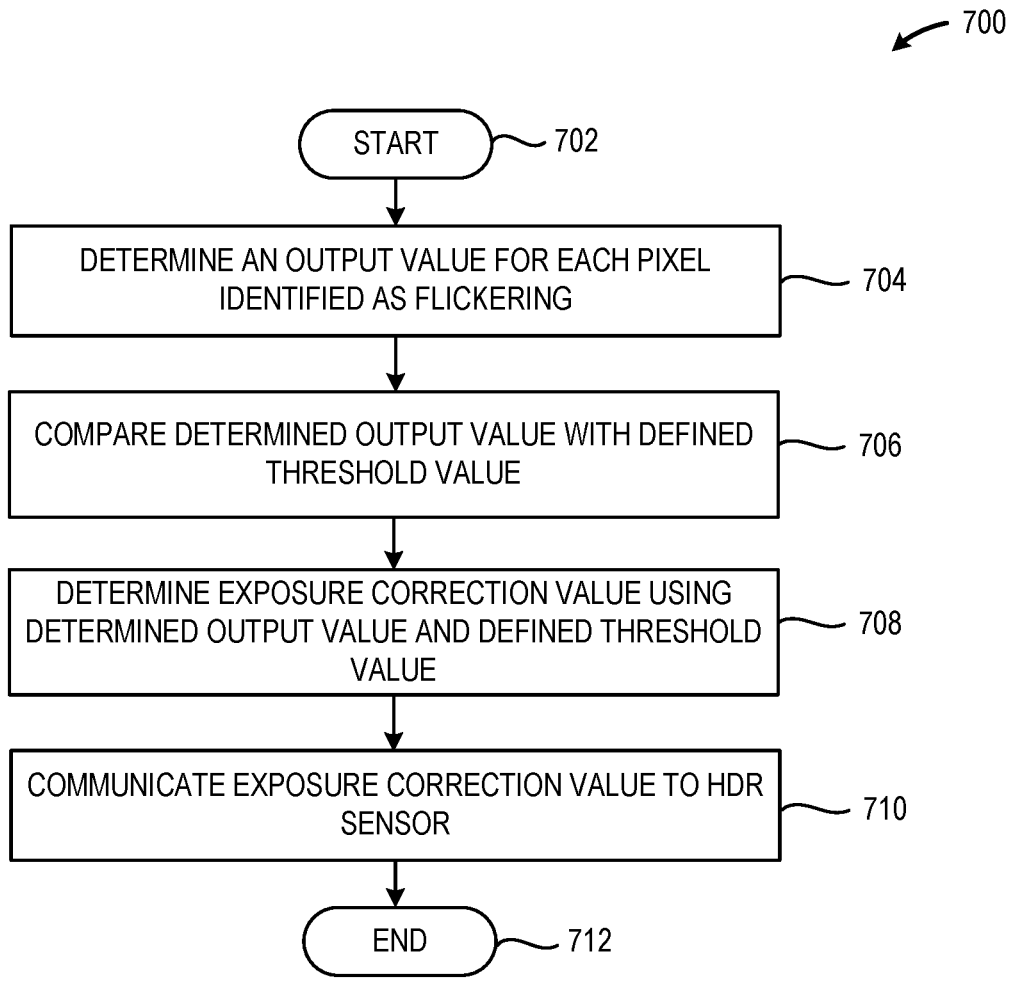
FIG. 7 is a high-level flow diagram of an illustrative method of correcting, altering, and/or adjusting the exposure settings and/or gain of one or more of the images collected or otherwise acquired by the image acquisition sensor circuitry, in accordance with at least one embodiment described herein.

FIG. 7 is a high-level flow diagram of an illustrative method 700 of correcting, altering, and/or adjusting the capture settings, such as the exposure time and various gains, of one or more of the images collected or otherwise acquired by the image acquisition sensor circuitry 110, in accordance with at least one embodiment described herein. The method 700 may be used in conjunction with methods 500 and/or 600, described in detail above with regard to FIGS. 5 and 6. The method 700 commences at 702.

At 704, the LFM circuitry 120 determines, calculates, extracts, and/or obtains one or more features associated with each pixel and/or pixel blocks identified as flickering.

At 706, the LFM circuitry 120 compares the determined one or more extracted features with one or more defined threshold values.

At 708, using the determined one or more extracted features and the one or more defined threshold values, the LFM circuitry 120 determines one or more exposure correction values to apply to one or more of the plurality of images generated by the image acquisition sensor circuitry 110.

At 710, the LFM circuitry 120 generates one or more output signals 202 that include information and/or data representative of the one or more determined exposure correction values.

The LFM circuitry 120 communicates the one or more output signals 202 to the image acquisition sensor circuitry 110. The method 700 concludes at 712.

While FIGS. 5, 6, and 7 illustrate various operations according to one or more embodiments, it is to be understood that not all of the operations depicted in FIGS. 5, 6, and 7 are necessary for other embodiments. Indeed, it is fully contemplated herein that in other embodiments of the present disclosure, the operations depicted in FIGS. 5, 6, and 7, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the terms "system" or "module" may refer to, for example, software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices.

As used in any embodiment herein, the term "circuitry" may comprise, for example, singly or in any combination, hardwired circuitry, programmable circuitry such as computer processors comprising one or more individual instruction processing cores, state machine circuitry, and/or firmware that stores instructions executed by programmable circuitry or future computing paradigms including, for example, massive parallelism, analog or quantum computing, hardware embodiments of accelerators such as neural net processors and non-silicon implementations of the above. The circuitry may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more mediums (e.g., non-transitory storage mediums) having stored therein, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software executed by a programmable control device.

Thus, the present disclosure is directed to systems and methods of detecting and minimizing the effect of flicker in images obtained using image acquisition sensor circuitry. Light flicker mitigation (LFM) circuitry receives a signal containing data representative of a plurality of images. Multi-feature extraction circuits in the LFM circuitry extract data representative of one or more features from some or all of the pixels included in the plurality of images. Light flicker detection and analysis circuits in the LFM circuitry detect flickering pixels in the plurality of images. Exposure index conversion circuits in the LFM circuitry determine one or more output corrections to apply to the plurality of images as the images are stitched to form a single HDR image in which flickering pixels are minimized, mitigated, or eliminated.

The following examples pertain to further embodiments. The following examples of the present disclosure may comprise subject material such as at least one device, a method, at least one machine-readable medium for storing instructions that when executed cause a machine to perform acts based on the method, means for performing acts based on the method and/or a system for detecting and minimizing the effect of flicker in multi-exposure data captures obtained using image acquisition sensor circuitry.

According to example 1, there is provided an image acquisition system. The system may include: high dynamic range (HDR) sensor circuitry to obtain multi-exposure image data for each of a plurality of pixels included in an image capture; light flicker mitigation (LFM) circuitry to: receive the image data from the image acquisition sensor; perform multi-exposure feature extraction to identify pixels included in the plurality of pixels that demonstrate flickering; determine, on a per-pixel basis, one or more correction factors to minimize, mitigate, reduce, avoid, or eliminate the contribution of pixels identified as demonstrating flickering in the HDR stitching process; HDR stitching circuitry to: adaptively produce, on a per-pixel basis, the display image using the image data received from the image acquisition sensor and the one or more correction factors received from the LFM circuitry.

Example 2 may include elements of example 1, and the system may additionally include: 3A (Auto-exposure/Auto-focus/Auto White Balance) adjustment circuitry coupled to the LFM circuitry and to the image acquisition sensor circuitry, the 3A circuitry to: adjust an auto-exposure setting of the image acquisition sensor circuitry using information received from the LFM circuitry indicative of one or more auto-exposure parameters.

Example 3 may include elements of any of examples 1 or 2 where the LFM circuitry to further, for each pixel identified as flickering, determine (extract) one or more features associated with the respective pixel; compare the one or more extracted features with one or more defined threshold values; determine an exposure correction value using the one or more output values and the one or more defined threshold values; and communicate the exposure correction value to the image acquisition sensor circuitry.

Example 4 may include elements of any of examples 1 through 3 where the one or more extracted features comprise at least one of an average value, a weighted average value, or a maximum value.

Example 5 may include elements of any of examples 1 through 4 where the one or more defined threshold values include at least one of a sensor saturation value or a scaled or otherwise modified value representative of a defined sensor saturation value.

Example 6 may include elements of any of examples 1 through 5 where, to determine an exposure correction value using the one or more extracted features and the one or more defined threshold values, 3A adjustment circuitry to further: convert at least one of a difference between the one or more extracted features or a ratio of the one or more extracted features to provide the exposure correction value using the one or more defined threshold values.

Example 7 may include elements of any of examples 1 through 6 where to perform multi-exposure feature extraction to identify pixels included in the plurality of pixels that demonstrate flickering, the LFM circuitry to further: perform multi-exposure feature extraction to identify pixels included in the plurality of pixels that demonstrate flickering using at least one of: a pixel value associated with the respective pixel or luminance components associated with the respective pixel.

Example 8 may include elements of any of examples 1 through 7 where, to perform multi-exposure feature extraction to identify pixels included in the plurality of pixels that demonstrate flickering, the LFM circuitry to: compare one or more multi-exposure features included in one or more pairs of images obtained by the image acquisition sensor and normalized for variations in capture settings for each of the images included in each of the one or more pairs of images.

Example 9 may include elements of any of examples 1 through 8 where, to perform multi-exposure feature extraction to identify pixels included in the plurality of pixels that demonstrate flickering, the LFM circuitry to: compare one or more multi-exposure features included in one or more pairs of images obtained by the image acquisition sensor by determining a difference between a first component and a second component using at least one of: one or more scale factors or one or more offset factors.

Example 10 may include elements of any of examples 1 through 9 where, to perform multi-exposure feature extraction to identify pixels included in the plurality of pixels that demonstrate flickering, the LFM circuitry to: determine a ratio between at least one of: pixel values associated with each respective pixel or luminance components associated with each respective pixel to detect flickering.

According to example 11, there is provided an image acquisition method. The method may include: obtaining, via high dynamic range (HDR) sensor circuitry, multi-exposure image data for each of a plurality of pixels included in an image capture; receiving, by light flicker mitigation (LFM) circuitry, the multi-exposure image data from the image acquisition sensor; performing, by the LFM circuitry, multi-exposure feature extraction to identify pixels included in the plurality of pixels that demonstrate flickering; determining, by the LFM circuitry on a per-pixel basis, one or more correction factors to adjust the output of pixels identified as demonstrating flickering; and adaptively producing, by HDR stitching circuitry the HDR image using the image data received from the image acquisition sensor and the one or more correction factors received from the LFM circuitry.

Example 12 may include elements of example 11, and the method may additionally include: adjusting, by 3A (Auto-exposure/Auto-focus/Auto White Balance) adjustment circuitry coupled to the LFM circuitry and to the image acquisition sensor circuitry, an auto-exposure setting of the image acquisition sensor circuitry using information received from the LFM circuitry indicative of one or more auto exposure parameters.

Example 13 may include elements of any of examples 11 or 12, and the method may further include: determining, by the LFM circuitry, for one or more extracted features associated with each pixel identified as flickering; comparing, by the 3A adjustment circuitry, the one or more extracted features with one or more defined threshold values; determining, by the 3A adjustment circuitry, an exposure correction value using the one or more extracted features and the one or more defined threshold values; and communicating, by the 3A adjustment circuitry, the exposure correction value to the image acquisition sensor circuitry.

Example 14 may include elements of any of examples 11 through 13 where comparing the one or more extracted features with the one or more defined threshold values comprises: comparing, by the 3A adjustment circuitry, at least one of an average value, a weighted average value, or a maximum value with the one or more defined threshold values.

Example 15 may include elements of any of examples 11 through 14 where determining an exposure correction value using the one or more extracted features and the one or more defined threshold values comprises: using, by the 3A adjustment circuitry, at least one of a sensor saturation value or a scaled or otherwise modified value representative of a defined sensor saturation value as the one or more defined threshold values.

Example 16 may include elements of any of examples 11 through 15 where determining an exposure correction value using the one or more extracted features and the one or more defined threshold values comprises: converting, by the 3A adjustment circuitry, at least one of a difference between the one or more extracted features or a ratio of the one or more extracted features to provide the exposure correction value using the one or more defined threshold values.

Example 17 may include elements of any of examples 11 through 16 where performing multi-exposure feature extraction to identify pixels included in the plurality of pixels that demonstrate flickering further comprises: performing, by the LFM circuitry, multi-exposure feature extraction to identify pixels included in the plurality of pixels that demonstrate flickering using at least one of a pixel value associated with the respective pixel or luminance components associated with the respective pixel.

Example 18 may include elements of any of examples 11 through 17 where performing multi-exposure feature extraction to identify pixels included in the plurality of pixels that demonstrate flickering further comprises: comparing, by the LFM circuitry, one or more multi-exposure features included in one or more pairs of images obtained by the image acquisition sensor and normalized for variations in capture settings for each of the images included in each of the one or more pairs of images.

Example 19 may include elements of any of examples 11 through 18 where performing multi-exposure feature extraction to identify pixels included in the plurality of pixels that demonstrate flickering further comprises: comparing, by the LFM circuitry, one or more multi-exposure features included in one or more pairs of images obtained by the image acquisition sensor by determining a difference between a first component and a second component using at least one of one or more scale factors or one or more offset factors.

Example 20 may include elements of any of examples 11 through 19 where performing multi-exposure feature extraction to identify pixels included in the plurality of pixels that demonstrate flickering further comprises: determining, by the LFM circuitry, a ratio between at least one of pixel values associated with each respective pixel or luminance components associated with each respective pixel to detect flickering.

According to example 21, there is provided a non-transitory storage device. The non-transitory storage device includes instructions that, when executed by light flicker mitigation (LFM) circuitry, cause the LFM circuitry to: receive, from high dynamic range (HDR) sensor circuitry, multi-exposure image data for each of a plurality of pixels included in an image capture; perform multi-exposure feature extraction to identify pixels included in the plurality of pixels that demonstrate flickering; determine, on a per-pixel basis, one or more correction factors to adjust the output of pixels identified as demonstrating flickering; and cause HDR stitching circuitry to adaptively produce, on a per-pixel basis, the display image using the image data received from the image acquisition sensor and the one or more correction factors received from the LFM circuitry.

Example 22 may include elements of example 21 where the instructions further cause the LFM circuitry to: cause 3A (Auto-exposure/Auto-focus/Auto White Balance) adjustment circuitry to adjust an auto-exposure setting of the image acquisition sensor circuitry using information received from the LFM circuitry indicative of one or more auto exposure parameters.

Example 23 may include elements of any of examples 21 or 22 where the instructions further cause the LFM circuitry to: determine (extract) one or more features associated with each pixel identified as flickering; cause the 3A adjustment circuitry to compare the one or more extracted features with one or more defined threshold values; cause the 3A adjustment circuitry to determine an exposure correction value using the one or more extracted features and the one or more defined threshold values; and cause the 3A adjustment circuitry to communicate the exposure correction value to the image acquisition sensor circuitry.

Example 24 may include elements of any of examples 21 through 23 where the instructions that cause the LFM circuitry to cause the 3A adjustment circuitry to compare the one or more extracted features with one or more defined threshold values further cause the LFM circuitry to: cause the 3A adjustment circuitry to compare at least one of an average value, a weighted average value, or a maximum value with the one or more defined threshold values.

Example 25 may include elements of any of examples 21 through 24 where the instructions that cause the LFM circuitry to cause the 3A adjustment circuitry to determine an exposure correction value using the one or more extracted features and the one or more defined threshold values further cause the LFM circuitry to: cause the 3A adjustment circuitry to determine the exposure correction value using one or more defined threshold values that includes at least one of a sensor saturation value or a scaled value representative of a defined sensor saturation value.

Example 26 may include elements of any of examples 21 through 25 where the instructions that cause the LFM circuitry to cause the 3A adjustment circuitry to determine an exposure correction value using the one or more extracted features and the one or more defined threshold values further cause the LFM circuitry to: cause the 3A adjustment circuitry to convert to the one or more defined threshold values to provide the exposure correction value using the one or more defined threshold values and at least one of a difference between the one or more extracted features and or a ratio of the one or more extracted features.

Example 27 may include elements of any of examples 21 through 26 where the instructions that cause the LFM circuitry to perform the multi-exposure feature extraction to identify pixels included in the plurality of pixels that demonstrate flickering further cause the LFM circuitry to: perform the multi-exposure feature extraction to identify pixels included in the plurality of pixels that demonstrate flickering using at least one of a pixel value associated with the respective pixel or one or more luminance components associated with the respective pixel.

Example 28 may include elements of any of examples 21 through 27 where the instructions that cause the LFM circuitry to perform the multi-exposure feature extraction to identify pixels included in the plurality of pixels that demonstrate flickering further cause the LFM circuitry to: compare one or more multi-exposure features included in one or more pairs of images obtained by the image acquisition sensor and normalized for variations in capture settings for each of the images included in each of the one or more pairs of images.

Example 29 may include elements of any of examples 21 through 28 where the instructions that cause the LFM circuitry to perform the multi-exposure feature extraction to identify pixels included in the plurality of pixels that demonstrate flickering further cause the LFM circuitry to: compare the one or more multi-exposure features included in one or more pairs of images obtained by the image acquisition sensor by determining a difference between a first component and a second component using at least one of one or more scale factors or one or more offset factors.

Example 30 may include elements of any of examples 21 through 29 where the instructions that cause the LFM circuitry to perform the multi-exposure feature extraction to identify pixels included in the plurality of pixels that demonstrate flickering further cause the LFM circuitry to: determine a ratio between at least one of pixel values associated with each respective pixel or luminance components associated with each respective pixel to detect flickering.

According to example 31, there is provided an image acquisition system. The system may include: means for obtaining, multi-exposure image data for each of a plurality of pixels included in an image; means for receiving the multi-exposure image data from the image acquisition sensor; means for performing multi-exposure feature extraction to identify pixels included in the plurality of pixels that demonstrate flickering; means for determining, on a per-pixel basis, one or more correction factors to minimize, mitigate, avoid, reduce, or eliminate the contributions of pixels identified as demonstrating flickering; and means for adaptively producing, on a per-pixel basis, the display image using the image data received from the image acquisition sensor and the one or more correction factors received from the light flicker mitigation circuitry.

Example 32 may include elements of example 31, and the system may further include: means for adjusting an auto-exposure setting of the image acquisition sensor circuitry using information received from the LFM circuitry indicative of one or more auto exposure parameters.

Example 33 may include elements of any of examples 31 or 32, and the system may further include: means for determining (extracting) one or more features associated with each pixel identified as flickering; means for comparing the one or more extracted features with one or more defined threshold values; means for determining an exposure correction value using the one or more extracted features and the one or more defined threshold values; and means for communicating the exposure correction value to the image acquisition sensor circuitry.

Example 34 may include elements of any of examples 31 through 33 where the means for comparing the one or more extracted features with the one or more defined threshold values comprises: means for comparing, by the 3A adjustment circuitry, at least one of an average value, a weighted average value, or a maximum value with the one or more defined threshold values.

Example 35 may include elements of any of examples 31 through 34 where the means for determining the exposure correction value using the one or more extracted features and the one or more defined threshold values comprises: means for obtaining at least one of a sensor saturation value or a scaled value representative of a defined sensor saturation value.

Example 36 may include elements of any of examples 31 through 35 where the means for determining the exposure correction value using the one or more extracted features and the one or more defined threshold values comprises: means for converting at least one of a difference between the one or more extracted features or a ratio of the one or more extracted features using the one or more defined threshold values to provide the exposure correction value.

Example 37 may include elements of any of examples 31 through 36 where the means for performing the multi-exposure feature extraction to identify pixels included in the plurality of pixels that demonstrate flickering further comprises: using at least one of a pixel value associated with the respective pixel or one or more luminance components associated with the respective pixel.

Example 38 may include elements of any of examples 31 through 37 where the means for performing the multi-exposure feature extraction to identify pixels included in the plurality of pixels that demonstrate flickering further comprises: means for comparing one or more multi-exposure features included in one or more pairs of images normalized for variations in capture settings for each of the images included in each of the one or more pairs of images.

Example 39 may include elements of any of examples 31 through 38 where the means for performing the multi-exposure feature extraction to identify pixels included in the plurality of pixels that demonstrate flickering further comprises: means for comparing one or more multi-exposure features included in one or more pairs of images obtained by the image acquisition sensor by determining a difference between a first component and a second component using at least one of one or more scale factors or one or more offset factors.

Example 40 may include elements of any of examples 31 through 39 where the means for performing the multi-exposure feature extraction to identify pixels included in the plurality of pixels that demonstrate flickering further comprises: means for determining a ratio between at least one of pixel values associated with each respective pixel or luminance components associated with each respective pixel to detect flickering.

According to example 41, there is provided a system for provision of detecting and minimizing the effect of flicker in images obtained using image acquisition sensor circuitry, the system being arranged to perform the method of any of examples 11 through 20.

According to example 42, there is provided a chipset arranged to perform the method of any of examples 11 through 20.

According to example 43, there is provided at least one machine-readable storage device that includes a plurality of instructions that, in response to be being executed on a computing device, cause the computing device to carry out the method according to any of examples 11 through 20.

According to example 44, there is provided a device configured for detecting and minimizing the effect of flicker in images obtained using image acquisition sensor circuitry, the device being arranged to perform the method of any of the examples 11 through 20.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

What is claimed:

1. An image acquisition system, comprising:
   high dynamic range (HDR) sensor circuitry configured to obtain multi-exposure image data for each of a plurality of pixels included in an image;
   light flicker mitigation (LFM) circuitry configured to:
   receive the multi-exposure image data from the an image acquisition sensor circuitry;
   perform multi-exposure feature extraction to identify pixels included in the plurality of pixels that demonstrate flickering;
   convert the identified pixels that demonstrate flickering to one or more values representative of a first exposure index that indicates a contribution of the identified pixels that demonstrate flickering to a corrected pixel in a stitched HDR image by assigning, to individual exposure images from among the multi-exposure image data, values within a detection range associated with the HDR sensor circuitry;
   repeat the conversion of identified pixels that demonstrate flickering for pairs of images from among the multi-exposure image data to calculate a second exposure index;
   determine one or more correction parameters based upon the second exposure index to reduce, in the stitched HDR image, a flickering effect of the pixels identified as demonstrating flickering; and
   HDR stitching circuitry to selectively generate the stitched HDR image using (i) the multi-exposure image data received from the image acquisition sensor circuitry, and (ii) the one or more correction parameters received from the LFM circuitry.

2. The system of claim 1, further comprising:
   auto-focus, auto-exposure, auto-white balance (3A) circuitry coupled to the LFM circuitry and to the image acquisition sensor circuitry, the 3A circuitry being configured to adjust an auto-exposure setting of the image acquisition sensor circuitry using information received from the LFM circuitry indicative of one or more exposure correction parameters.

3. The system of claim 2, wherein the LFM circuitry is further configured to:
   for each pixel identified as flickering, determine one or more features associated with the respective pixel;
   compare the one or more extracted features with one or more defined threshold values;
   determine the one or more exposure correction parameters using the one or more extracted features and the one or more defined threshold values; and
   communicate the one or more exposure correction parameters to the image acquisition sensor circuitry.

4. The system of claim 3, wherein the one or more extracted features comprise at least one of an average value, a weighted average value, a luminance value, or a maximum value.

5. The system of claim 3, wherein the one or more defined threshold values include at least one of a sensor saturation value, a scaled value representative of a defined sensor saturation value, or a user-defined value.

6. The system of claim 3, wherein the 3A circuitry is further configured to convert at least one of (i) a difference between the one or more extracted features, or (ii) a ratio of the one or more extracted features, using the one or more defined threshold values, to determine the one or more exposure correction parameters.

7. The system of claim 1, wherein the LFM circuitry is further configured to perform the multi-exposure feature extraction to identify pixels included in the plurality of pixels that demonstrate flickering by:
   identifying pixels included in the plurality of pixels that demonstrate flickering using at least one of a pixel value associated with the respective pixel, luminance components associated with the respective pixel, or other representative values associated with the respective pixel; and
   performing enhancement, for at least one of extracted features or obtained correction parameters, using at least one of low-pass filtering and morphological processing.

8. The system of claim 7, wherein the LFM circuitry is further configured to perform multi-exposure feature extraction to identify pixels included in the plurality of pixels that demonstrate flickering by comparing one or more multi-exposure features included in one or more pairs of images obtained by the image acquisition sensor circuitry and normalized for variations in capture settings, for each of the images included in each of the one or more pairs of images.

9. The system of claim 7, wherein the LFM circuitry is further configured to perform multi-exposure feature extraction to identify pixels included in the plurality of pixels that demonstrate flickering by comparing one or more multi-exposure features included in one or more pairs of images obtained by the image acquisition sensor circuitry by determining a difference between a first component and a second component using at least one of one or more scale factors or one or more offset factors.

10. The system of claim 7, wherein the LFM circuitry is further configured to perform multi-exposure feature extraction to identify pixels included in the plurality of pixels that demonstrate flickering by:
  determining a ratio between at least one of pixel values associated with each respective pixel, luminance components, or other representative values associated with each respective pixel to detect flickering; and
  comparing the determined ratio with one or more threshold values.

11. The system of claim 1, wherein the LFM circuitry is configured to assign, to the individual exposure images from among the multi-exposure image data, values within the detection range based upon different exposure times of the individual exposure images.

12. A non-transitory storage device that includes instructions that, when executed by light flicker mitigation (LFM) circuitry, cause the LFM circuitry to:
  receive, from image acquisition sensor circuitry, image data for each of a plurality of pixels included in each of a plurality of images;
  perform multi-exposure feature extraction to identify pixels included in the plurality of images that demonstrate flickering;
  convert the identified pixels that demonstrate flickering to one or more values representative of a first exposure index that indicates a contribution of the identified pixels that demonstrate flickering to a corrected pixel in a stitched high dynamic range (HDR) image by assigning, to individual exposure images from among the multi-exposure image data, values within a detection range associated with a HDR sensor circuitry;
  repeat the conversion of identified pixels that demonstrate flickering for pairs of images from among the multi-exposure image data to calculate a second exposure index;
  determine one or more correction parameters based upon the second exposure index to reduce the contributions of pixels identified as demonstrating flickering to an output pixel; and
  cause HDR stitching circuitry to selectively and adaptively combine the plurality of images using the image data received from the image acquisition sensor circuitry and the one or more correction parameters received from the LFM circuitry to generate the stitched HDR image.

13. The non-transitory storage device of claim 12 wherein the instructions further cause the LFM circuitry to:
  cause auto-focus, auto-exposure, auto-white balance (3A) circuitry to adjust an auto-exposure setting of the image acquisition sensor circuitry using information received from the LFM circuitry indicative of one or more exposure correction parameters.

14. The non-transitory storage device of claim 13, wherein the instructions further cause the LFM circuitry to:
  determine one or more features associated with each pixel identified as flickering;
  cause the 3A adjustment circuitry to compare the one or more extracted features with one or more defined threshold values;
  cause the 3A adjustment circuitry to determine the one or more exposure correction parameters using the one or more extracted features and the one or more defined threshold values; and
  cause the 3A adjustment circuitry to communicate the one or more exposure correction parameters to the image acquisition sensor circuitry.

15. The non-transitory storage device of claim 14, wherein the instructions that cause the LFM circuitry to cause the 3A adjustment circuitry to compare the one or more extracted features with one or more defined threshold values further cause the LFM circuitry to:
  cause the 3A adjustment circuitry to compare the one or more extracted features including at least one of an average value, a weighted average value, luminance value, or a maximum value with the one or more defined threshold values.

16. The non-transitory storage device of claim 14, wherein the instructions that cause the LFM circuitry to cause the 3A adjustment circuitry to determine the one or more exposure correction parameters using the one or more extracted features and the one or more defined threshold values further cause the LFM circuitry to:
  cause the 3A adjustment circuitry to determine the one or more exposure correction parameters using one or more defined threshold values that include at least one of a sensor saturation value, a scaled value representative of a defined sensor saturation value, or a user-defined value.

17. The non-transitory storage device of claim 14, wherein the instructions that cause the LFM circuitry to cause the 3A circuitry to determine the one or more exposure correction parameters using the one or more extracted features and the one or more defined threshold values further cause the LFM circuitry to:
  cause the 3A circuitry to provide the one or more exposure correction parameters using the one or more threshold values and at least one of a difference between the one or more extracted features or a ratio of the one or more extracted features.

18. The non-transitory storage device of claim 12, wherein the instructions that cause the LFM circuitry to perform the multi-exposure feature extraction to identify pixels included in the plurality of pixels that demonstrate flickering further cause the LFM circuitry to:
  perform the multi-exposure feature extraction to identify pixels included in the plurality of pixels that demonstrate flickering using at least one of a pixel value associated with the respective pixel, one or more luminance components associated with the respective pixel, or one or more other representative values associated with the respective pixels; and
  perform enhancement, for at least one of extracted features or obtained correction parameters, using at least one of low-pass filtering and morphological processing.

19. The non-transitory storage device of claim 18, wherein the instructions that cause the LFM circuitry to perform the multi-exposure feature extraction to identify pixels included in the plurality of pixels that demonstrate flickering further cause the LFM circuitry to:
  compare one or more multi-exposure features included in one or more pairs of images obtained by the image acquisition sensor circuitry and normalized for variations in capture settings, for each of the images included in each of the one or more pairs of images.

20. The non-transitory storage device of claim 18, wherein the instructions that cause the LFM circuitry to perform the multi-exposure feature extraction to identify pixels included in the plurality of pixels that demonstrate flickering further cause the LFM circuitry to:
  compare the one or more multi-exposure features included in one or more pairs of images obtained by the image acquisition sensor circuitry by determining a difference between a first component and a second component using at least one of one or more scale factors or one or more offset factors.

21. The non-transitory storage device of claim 18, wherein the instructions that cause the LFM circuitry to perform the multi-exposure feature extraction to identify pixels included in the plurality of pixels that demonstrate flickering further cause the LFM circuitry to:
determine a ratio between at least one of pixel values associated with each respective pixel, luminance components associated with each respective pixel, or other representative values associated with each respective pixel to detect flickering; and
compare the determined ratio with one or more threshold values.

22. An image acquisition system, comprising:
means for obtaining image data for each of a plurality of pixels included in each of a plurality of images;
means for receiving the obtained image data from an image acquisition sensor circuitry;
means for performing multi-exposure feature extraction to identify pixels included in the plurality of images that demonstrate flickering;
means for converting the identified pixels that demonstrate flickering to one or more values representative of a first exposure index that indicates a contribution of the identified pixels that demonstrate flickering to a corrected pixel in a stitched high dynamic range (HDR) image by assigning, to individual exposure images from among multi-exposure image data, values within a detection range associated with a HDR sensor circuitry;
means for repeating the conversion of identified pixels that demonstrate flickering for pairs of images from among the multi-exposure image data to calculate a second exposure index;
means for determining one or more correction parameters based upon the second exposure index to adjust the contributions of the pixels identified as demonstrating flickering to an output pixel; and
means for selectively stitching the plurality of images using the image data received from the image acquisition sensor circuitry and the one or more correction parameters received from light flicker mitigation (LFM) circuitry to generate the stitched HDR image.

23. The system of claim 22, further comprising:
means for adjusting an auto-exposure setting of the image acquisition sensor circuitry using information received from the LFM circuitry indicative of the one or more exposure correction parameters.

24. The system of claim 23, further comprising:
means for determining one or more features associated with each pixel identified as flickering;
means for comparing the one or more extracted features with one or more defined threshold values;
means for determining the one or more exposure correction parameters using the one or more extracted features and the one or more defined threshold values; and
means for communicating the one or more exposure correction parameters to the image acquisition sensor circuitry.

25. The system of claim 24, wherein the means for comparing the one or more extracted features with the one or more defined threshold values comprises:
means for comparing, by auto-focus, auto-exposure, auto-white balance (3A) circuitry circuitry, at least one of an average value, a weighted average value, a luminance value, or a maximum value as the one or more extracted features with the one or more defined threshold values.

26. The system of claim 24, wherein the means for determining the one or more exposure correction parameters using the one or more extracted features and the one or more defined threshold values comprises:
means for determining the one or more exposure correction parameters using the one or more extracted features and the one or more defined threshold values including at least one of a sensor saturation value, a scaled value representative of a defined sensor saturation value, or a user-defined value.

27. The system of claim 24, wherein the means for determining the one or more exposure correction parameters using the one or more extracted features and the one or more defined threshold values comprises:
means for converting at least one of a difference between the one or more extracted features or a ratio of the one or more extracted features using the one or more defined threshold values to provide the one or more exposure correction parameters.

28. The system of claim 22, wherein the means for performing the multi-exposure feature extraction to identify pixels included in the plurality of pixels that demonstrate flickering further comprises:
means for performing the multi-exposure feature extraction to identify pixels included in the plurality of pixels that demonstrate flickering using at least one of a pixel value associated with the respective pixel, one or more luminance components associated with the respective pixel, or one or more other representative values associated with the respective pixel; and
means for performing enhancement, for at least one of extracted features or obtained correction parameters, using at least one of low-pass filtering and morphological processing.

29. The system of claim 28, wherein the means for performing the multi-exposure feature extraction to identify pixels included in the plurality of pixels that demonstrate flickering further comprises:
means for comparing one or more multi-exposure features included in one or more pairs of images normalized for variations in capture settings for each of the images included in each of the one or more pairs of images.

30. The system of claim 28, wherein the means for performing the multi-exposure feature extraction to identify pixels included in the plurality of pixels that demonstrate flickering further comprises:
means for comparing one or more multi-exposure features included in one or more pairs of images obtained by the image acquisition sensor circuitry by determining a difference between a first component and a second component using at least one of one or more scale factors or one or more offset factors.

31. The system of claim 28, wherein the means for performing the multi-exposure feature extraction to identify pixels included in the plurality of pixels that demonstrate flickering further comprises:
means for determining a ratio between at least one of pixel values associated with each respective pixel, luminance components associated with each respective pixel, or other representative values associated with each respective pixel to detect flickering;
means for comparing the determined ratio with one or more threshold values.

* * * * *